United States Patent
Calba et al.

(10) Patent No.: US 9,110,223 B2
(45) Date of Patent: Aug. 18, 2015

(54) METHOD FOR TREATING THE SURFACE OF A SUBSTRATE BASED ON SULPHUR POLYMER, INTENDED TO BE COVERED WITH A COATING

(75) Inventors: Pierre-Jean Calba, Charenton le Pont (FR); Joseph Martin, Charenton le Pont (FR)

(73) Assignee: Essilor International (Compagnie Generale d'Optique), Charenton Le Pont (FR)

( * ) Notice: Subject to any disclaimer, the term of this patent is extended or adjusted under 35 U.S.C. 154(b) by 981 days.

(21) Appl. No.: 12/664,308

(22) PCT Filed: Jun. 12, 2008

(86) PCT No.: PCT/FR2008/051052
§ 371 (c)(1),
(2), (4) Date: Apr. 1, 2010

(87) PCT Pub. No.: WO2008/155507
PCT Pub. Date: Dec. 24, 2008

(65) Prior Publication Data
US 2010/0189889 A1    Jul. 29, 2010

(30) Foreign Application Priority Data
Jun. 13, 2007  (FR) ..................... 07 55744

(51) Int. Cl.
*B05D 5/06*       (2006.01)
*G02B 1/04*       (2006.01)
*G02B 1/12*       (2006.01)
*G02B 1/10*       (2006.01)
*B05D 5/10*       (2006.01)
*C08J 7/12*       (2006.01)

(52) U.S. Cl.
CPC ... *G02B 1/10* (2013.01); *C08J 7/12* (2013.01); *B05D 5/10* (2013.01); *C08J 2333/14* (2013.01); *C08J 2341/00* (2013.01); *C08J 2375/04* (2013.01); *G02B 1/04* (2013.01); *G02B 1/041* (2013.01); *G02B 1/12* (2013.01)

(58) Field of Classification Search
CPC ............ B05D 5/10; G02B 1/04; G02B 1/041; G02B 1/10; G02B 1/12
See application file for complete search history.

(56) References Cited

U.S. PATENT DOCUMENTS

| | | | | |
|---|---|---|---|---|
| 4,065,435 A | * | 12/1977 | Sakaguchi et al. | 525/327.6 |
| 4,689,387 A | | 8/1987 | Kajimoto et al. | 528/76 |
| 4,775,733 A | | 10/1988 | Kanemura et al. | 528/67 |
| 4,940,602 A | * | 7/1990 | Taniguchi et al. | 427/489 |
| 5,087,758 A | | 2/1992 | Kanemura et al. | 568/57 |
| 5,191,055 A | | 3/1993 | Kanemura et al. | 528/77 |
| 5,608,115 A | | 3/1997 | Okazaki et al. | 568/61 |
| 5,741,831 A | | 4/1998 | Keita et al. | 523/106 |
| 5,750,156 A | * | 5/1998 | Maus et al. | 425/139 |
| 5,837,797 A | | 11/1998 | Okazaki et al. | 528/76 |
| 6,225,021 B1 | * | 5/2001 | Widawski et al. | 430/270.1 |
| 6,362,147 B1 | * | 3/2002 | Castro et al. | 510/235 |
| 6,489,028 B1 | * | 12/2002 | Degand et al. | 428/423.1 |
| 6,558,586 B1 | * | 5/2003 | Padiou et al. | 264/1.7 |
| 2004/0012002 A1 | * | 1/2004 | Vassal et al. | 252/586 |
| 2004/0176749 A1 | * | 9/2004 | Lohmann et al. | 604/891.1 |
| 2005/0118202 A1 | * | 6/2005 | Yamashita et al. | 424/400 |
| 2008/0050600 A1 | * | 2/2008 | Fan et al. | 428/447 |

FOREIGN PATENT DOCUMENTS

| | | |
|---|---|---|
| EP | 367095 A2 * | 5/1990 |
| EP | 0 394 495 | 10/1990 |
| EP | 0 745 620 | 12/1996 |
| EP | 1 053 279 | 11/2000 |
| EP | 1 273 639 | 1/2003 |

* cited by examiner

Primary Examiner — James M Mellott
(74) Attorney, Agent, or Firm — Norton Rose Fulbright US LLP

(57) ABSTRACT

The invention relates to a method for treating at least one surface of a substrate based on sulphur polymer intended to be covered with a coating, said method comprising, prior to depositing the coating onto the surface of the substrate, a step of bringing the surface of the substrate into contact with a treating composition comprising at least one reducing agent.

38 Claims, No Drawings

METHOD FOR TREATING THE SURFACE OF A SUBSTRATE BASED ON SULPHUR POLYMER, INTENDED TO BE COVERED WITH A COATING

This application is a national phase application under 35 U.S.C. §371 of International Application No. PCT/FR2008/051052 filed 12 Jun. 2008, which claims priority to French Application No. 0755744 filed 13 Jun. 2007. The entire text of each of the above-referenced disclosures is specifically incorporated herein by reference without disclaimer.

The invention relates to a method for treating at least one surface of a substrate based on sulphur polymer, intended to be covered with a coating, said method improving the adhesion of the coating to the substrate.

It is usual, in the ophthalmic optics field, to cover the surfaces of an organic glass substrate, such as an ophthalmic lens made of organic glass, for example a glass for eyeglasses, with coatings such as abrasion-resistant hard coats, so as to improve the impact and scratch resistance of the thus obtained ophthalmic lens.

However, such coated organic glass substrates may suffer from a poor adhesion of the coating to the substrate.

It is known to treat the surface of the organic glass substrates prior to depositing the coating onto the surface, with an aqueous soda solution.

It is also known from EP 1 053 279 to use a method for coating the surface of an organic glass substrate comprising, prior to depositing the coating onto the surface of the substrate, contacting the surface of the substrate with an aqueous treating solution comprising a surfactant and having an acidic pH.

However, these methods of the prior art, although they provide good results, are not fully satisfying. In a number of situations, an abrasion-resistant coating delamination problem could be observed.

Without wishing to be bound to any particular theory, the applicant has identified a plurality of reasons which could be responsible for the abrasion-resistant coating delamination.

The leading cause for the weakness of the abrasion-resistant coating adhesion to the substrate derives from the fact that the substrate/abrasion-resistant coating interface may typically be described as an interface that is highly distinctive from a monolayer-on-monolayer stack. This is due to the lack of diffusion from the abrasion-resistant coating to the substrate, to a surface preparation that does generally not tend to create covalent bonds and to a very low surface roughness of the substrate.

As a result, the low energy chemical bonds (hydrogen bonds through sulphur or oxygen atoms) are predominant as compared to covalent bonds. Therefore, they contribute more actively to the adhesion mechanism of the abrasion-resistant coating to the substrate, than the covalent bonds do.

Moreover, under the UV-A radiation action, the thioether functions, for example the thioether functions of a polythiourethane that exist at the interface level are decomposed as a result of a polymer chain cleavage near to the lateral chain ends, to degradation products that are small organic molecules. These degradation products are transferred through migration and diffusion mechanisms to all material interstices, where they will create an actual receptacle of corrosion thus coming through the whole thickness of the abrasion-resistant coating. As these degradation products do accumulate within the substrate, a mineralization of the latter can be observed.

At last, the extreme photosensitivity towards UV-A radiation of some polymer substrates, especially sulphur-containing polymer substrates, and more particularly of some polythiourethanes, contributes to the weakening of the adhesion forces that are present at the substrate/abrasion-resistant coating interface. For some substrates, upon UV-A irradiation, the thioether units within the first layers of the substrate are subjected to a photocyclization leading to the weak bond breaking existing at the interface, as is illustrated on FIG. 1.

The cyclization is all the more particularly facilitated as sulphur and nitrogen are mutually in the 1,6 position.

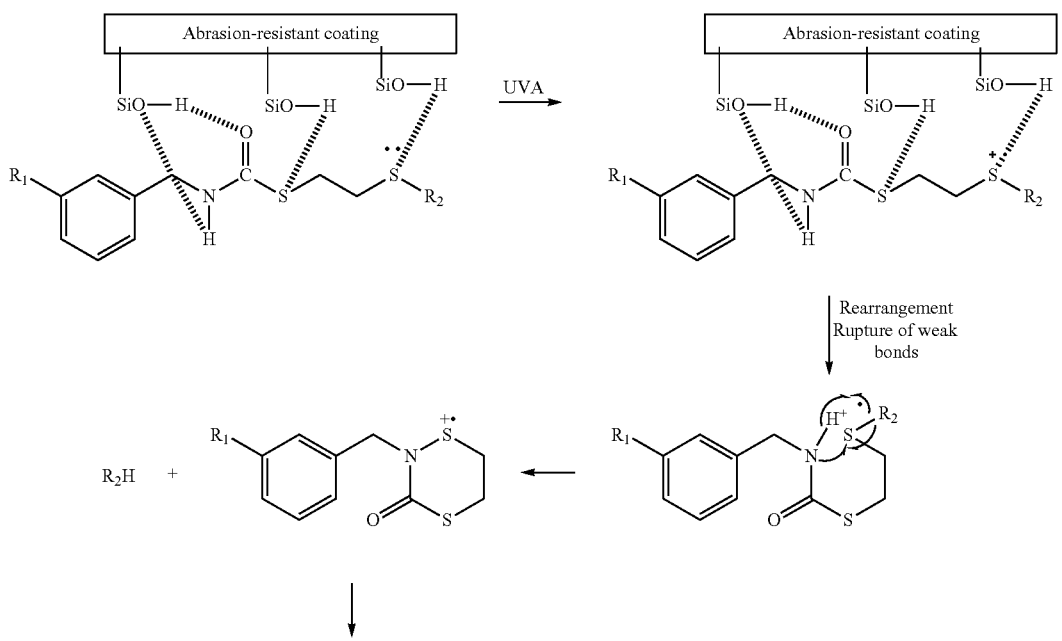

FIG. 1

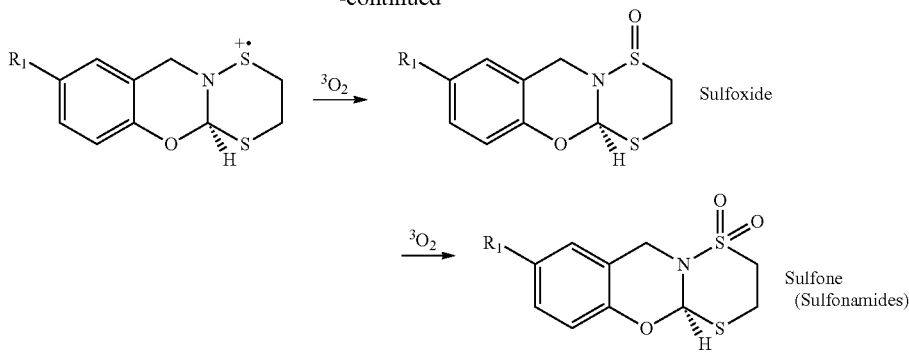

R₁ and R₂ represent chains of the polymer network to which the illustrated moiety is linked.

There is thus a need for solving the problems of the prior art and for providing a method for treating the surface of a substrate based on sulphur polymer intended to be covered with a coating, which would improve the adhesion of the coating to the substrate and slow down the yellowing phenomenon of the substrate due to photo-oxidation.

The applicant discovered that it could be effected thanks to a method comprising a step of bringing the surface of the substrate into contact with an agent which reduces the photoreactivity of the substrate's thioether functions.

It is thus an object of the present invention to provide a method for treating at least one surface of a substrate based on sulphur polymer intended to be covered with a coating, said method comprising, prior to depositing the coating onto the surface of the substrate, a step of bringing the surface of the substrate into contact with a treating composition comprising at least one reducing agent.

Without wishing to be bound to any particular theory, the applicant thinks that the reducing agent reduces the photoreactivity of the substrate's thioether functions, that is to say it enables the substrate's polymer to be functionalized through the creation of SH bonds, it restricts the breaking down of the thioether functions to degradation products upon UV-A irradiation, or it prevents the sulphur chains from getting cyclized, especially the thioether units, within the first layers of the substrate under the UV-A radiation.

The reducing agent(s) to be suitably used in the method of the invention may be any type of reducing agents classically used for reducing C—S, S—S, CON (amide) bonds, salts, preferably C—S and S—S bonds.

The reducing agent(s) is or are generally selected from thioacids and salts thereof.

Suitable reducing agents to be used in the method of the invention especially include thioglycolic acid, potassium thioglycolate, sodium thioglycolate, calcium thioglycolate, magnesium thioglycolate, glycerol monothioglycolate, ammonium thioglycolate, amine thioglycolates such as monoethanol amine thioglycolate, diammonium dithioglycolate, thiolactic acid, ammonium thiolactate, guanidine thioglycolate, thiomalic acid, 2-mercaptoproprionic acid, 3-mercaptoproprionic acid, lipoic acid, dihydrolipoic acid, thiosalicylic acid, dithioerythritol, thioglycerol, thioglycol, dithioerythritol, dithiothreitol, 1,3-dithiopropanol, thioxanthine, cysteine, homocysteine, a N-acetyl-L-cysteine, cysteamine, N-acetyl-cysteamine, N-propionyl-cysteamine, pantheteine, $NaHSO_3$, LiS, $Na_2S$, $K_2S$, MgS, CaS, SrS, BaS, $(NH_4)_2S$, sodium dihydrolipoate 6,8-dithiooctanoate, sodium 6,8-dithiooctanoate, hydrogen sulfide salts such as NaSH and KSH, thioglycolamide, glutathione, thioglycol hydrazide, keratinase, hydrazine sulfate, hydrazine disulfate, triisocyanate, 2,3-dimercaptosuccinic acid, N-(mercaptoalkyl)-ω-hydroxyalkyl amides, N-mono or N,N-dialkylmercapto-4-butyramides, aminomercapto-alkyl amides, N-(mercaptoalkyl)succinamic acid derivatives and N-(mercaptoalkyl)succinimide derivatives, alkylamino mercaptoalkyl amides, azeotropic mixture of 2-hydroxypropyl thioglycolate and (2-hydroxy-1-methyl)ethyl thioglycolate, mercaptoalkyl aminoamides, N-mercapto-alkylalkane diamides and formamidine sulfinic acid derivatives, sulfites, bisulfites, and salts thereof.

Preferred reducing agents are thioacids or salts thereof, and are preferably selected from sodium thioglycolate, potassium thioglycolate, ammonium thioglycolate and amine thioglycolates.

When the reducing agent(s) is or are thioacid(s), the one or more SH function(s) preferably come(s) as an S⁻, and the one or more carboxyl function(s) preferably come(s) as a COO⁻.

So, preferably, the pH value of the treating composition is higher than 10, more preferably higher than 12.

The pH value of the treating composition of the invention may be traditionally obtained and/or adjusted by adding alkaline agents, such as for example ammonia, monoethanol amine, diethanol amine, triethanol amine, isopropanol amine, propanediamine-1,3, an alkaline or ammonium carbonate or bicarbonate, an organic carbonate such as guanidine carbonate, or an alkali metal hydroxide, such as potassium hydroxide, or an alkaline-earth metal hydroxide, such as calcium hydroxide, where all these compounds may of course be considered either alone in combination.

The treating composition generally comprises from 2 to 30%, preferably from 2 to 15%, more preferably from 5 to 10% by weight, as related to the composition total weight, of said reducing agent(s).

Advantageously, the treating composition comprises at least one metal sulphur.

Advantageously, the treating composition comprises urea. If so, urea is generally present in an amount ranging from 0.1% to 20% by weight, preferably from 0.5% to 10% by weight, as related to the treating composition total weight.

Generally, the treating composition comprising the reducing agent(s) comprises a solvent. To be mentioned as suitable solvents are water, $C_1$-$C_6$ alcohols, preferably alkanols such as ethanol, propanol and isopropanol, alkane diols such as ethylene glycol, propylene glycol and pentane diol, benzyl alcohol, $C_5$-$C_{10}$ alkanes, acetone, methyl ethyl ketone, methyl acetate, ethyl acetate, butyl acetate, dimethoxyethane, diethoxyethane and combinations thereof.

Treating compositions comprising one or more reducing agent(s) to be suitably used in the method of the invention are described as a depilatory composition in the patent GB 2 413 074.

Commercially available depilatory compositions may be used. As an example, the depilatory cream Veet may be mentioned.

The exposure time of the composition of the invention preferably varies from 1 to 30 minutes, more preferably from 1 to 15 minutes, and even more preferably from 5 to 10 minutes.

The treating temperature preferably varies from 5 to 30° C., more preferably from 5 to 15° C. In an optimal embodiment of the invention, the treatment is carried out at room temperature.

The treatment is preferably carried out by dipping the substrate into a bath filled with the composition of the invention.

The treatment based upon the reducing agent may be carried out repeatedly, preferably up to five times consecutively, preferably between 1 and 3 times consecutively.

As previously explained, the method of the invention comprises a step of bringing the surface of the substrate into contact with a treating composition comprising at least one reducing agent.

Advantageously, ultrasonic energy is applied to the treating composition when contacting the surface of the substrate.

Preferably, the method of the invention does not comprise any subsequent step of applying a soda solution onto the substrate.

So, the method of the invention makes it possible to reduce C—S and/or S—S bonds in the sulphur polymer forming the substrate, causing the polymer to get functionalized through the creation of SH bonds near the surface, generally on a thickness lower than 1 µm.

The method of the invention also enables to restrain the production of degradation products when exposing the substrate to UV-A radiation.

According to a particular embodiment of the invention, the method comprises at least one additional treating step of bringing the substrate into contact with an oxidizing composition comprising at least one oxidizing agent.

This or these additional treating step(s) by means of an oxidizing composition may be carried out before and/or after the treating step using the reducing agent.

Without wishing to be bound to any particular theory, the applicant thinks that such oxidizing agents reduce the photoreactivity of the substrate's thioether functions and in particular prevent the photocyclization upon UV-A radiation of the substrate's sulphur chains, by oxidizing the sulphur near to nitrogen, especially the sulphur at the 6-position of the nitrogen, (as illustrated in FIG. 1) which is then not available anymore for reacting in the cyclization reaction. The oxidizing agent would enable to prevent the 1,6-cycloaddition of the thioether units through the chemical adsorption of elements brought by the oxidizing agent, filling all the vacant atomic orbitals in the sulphur external electronic layer.

The chemical adsorption also enables to reinforce the molecular interactions between the substrate and the coating when the latter will be deposited, especially through the creation of polar sites.

The oxidizing agent(s) is or are generally selected from hydrogen peroxide, alkali bromates, polythionates and persalts, such as perborates, percarbonates, persulfates and permanganates.

Preferably, the oxidizing agent(s) is or are selected from $H_2O_2$ and $KMnO_4$.

Generally, the oxidizing agent(s) is or are comprised in the oxidizing composition in an amount ranging from 2 to 15%, preferably from 5 to 10% by weight, as related to the oxidizing composition total weight.

Preferably, the pH value of the oxidizing composition containing said oxidizing agent(s) is lower than 7.

Generally, the oxidizing composition containing the oxidizing agent(s) comprises a solvent. To be mentioned as suitable solvents are water, $C_1$-$C_6$ alcohols, preferably alkanols such as ethanol, propanol and isopropanol, alkane diols such as ethylene glycol, propylene glycol and pentane diol, benzyl alcohol, $C_5$-$C_{10}$ alkanes, acetone, methyl ethyl ketone, methyl acetate, ethyl acetate, butyl acetate, dimethoxyethane, diethoxyethane and combinations thereof.

According to another particular embodiment of the invention, the method comprises at least one additional treating step by bringing the substrate into contact with a phosphorylation composition comprising at least one phosphorylating agent.

This or these additional treating step(s) using a phosphorylation composition may be carried out before and/or after the treating step using the reducing agent.

As used herein, a "phosphorylating agent" is intended to mean an agent enabling to introduce a phosphorous or a phosphate compound into an organic combination.

The phosphorylating agent is generally selected from trialkylphosphites, phosphonic acid and phosphinic acid.

The phosphorylating agent makes it possible to prevent the 1,6-cycloaddition of the thioether units through chemical adsorption of this agent onto the thioether function sulphur atoms. This offers to the substrate a plurality of possible chemical interactions with the coating once this will have been deposited.

Generally, the phosphorylating agent(s) is or are comprised in the phosphorylation composition in an amount ranging from 2% to 15%, preferably from 5 to 10%, by weight as related to the phosphorylation composition total weight.

Preferably, the pH value of the composition comprising the phosphorylating agent is lower than 7.

Generally, the composition comprising the phosphorylating agent(s) comprises a solvent. To be mentioned as suitable solvents are water, $C_6$-$C_6$ alcohols, preferably alkanols such as ethanol, propanol and isopropanol, alkane diols such as ethylene glycol, propylene glycol and pentane diol, benzyl alcohol, $C_5$-$C_{10}$ alkanes, acetone, methyl ethyl ketone, methyl acetate, ethyl acetate, butyl acetate, dimethoxyethane, diethoxyethane and combinations thereof.

Preferably, the method of the invention does not comprise any additional treating step using an oxidizing or a phosphorylation composition.

As previously explained, the substrate is based on a sulphur polymer.

Generally, the sulphur polymer in the substrate is selected from polythio(meth)acrylates, polythiourethanes, polythiourethane-urea and polyepisulfides.

Polythio(meth)acrylates to be suitably used as substrates in the method of the invention may be selected from all the polythio(meth)acrylates classically used in ophthalmic optics, especially for making ophthalmic lenses.

Precursor monomers of polythio(meth)acrylates to be used in the composition of the invention are described in particular in the American patent U.S. Pat. No. 5,741,831.

According to a preferred embodiment, the sulphur polymer is a polythiourethane resulting from the polymerization of at least one polyisocyanate monomer and/or a prepolymer thereof and of at least one polythiol monomer and/or a prepolymer thereof.

Polythiol monomers to be suitably used in the compositions of the invention are well known in the art and may correspond to the formula $R'(SH)_{n'}$, wherein n' is an integer equal to or higher than 2, preferably ranging from 2 to 5, and R' is an aliphatic, an aromatic or a heterocyclic radical.

Polythiols are described amongst others in EP 394 495.

Polythiols that may be suitably used in the invention include 9,10-anthracene dimethanethiol, 1,11-undecane dithiol, 4-ethyl-benzene-1,3-dithiol, 1,2-ethane dithiol, 1,8-octane dithiol, 1,18-octadecane dithiol, 2,5-dichlorobenzene-1,3-dithiol, 1,3-(4-chlorophenyl)propane-2,2-dithiol, 1,1-cyclohexane dithiol, 1,2-cyclohexane dithiol, 1,4-cyclohexane dithiol, 1,1-cycloheptane dithiol, 1,1-cyclopentane dithiol, 4,8-dithioundecane-1,11-dithiol, dithiopentaerythritol, dithiothreitol, 1,3 diphenylpropane-2,2-dithiol, 1,3-dihydroxy-2-propyl-2',3'-dimercaptopropylether, 2,3-dihydroxypropyl-2',3'-dimercaptopropylether, 2,6-dimethyloctane-2,6-dithiol, 2,6-dimethyloctane-3,7-dithiol, 2,4-dimethylbenzene-1,3-dithiol, 4,5-dimethylbenzene-1,3-dithiol, 3,3-dimethylbutane-2,2-dithiol, 2,2-dimethylpropane-1,3-dithiol, 1,3-di(4-methoxyphenyl) propane-2,2-dithiol, 3,4-dimethoxybutane-1,2-dithiol, 10,11-dimercaptoundecanoic acid, 6,8-dimercapto-octanoic acid, 2,5-dimercapto-1,3,4-thiadiazole, 2,2'-dimercapto-biphenyl, 4,4'-dimercaptobiphenyl, 4,4'-dimercaptobibenzyl, 3,4-dimercaptobutanol, 3,4-dimercaptobutylacetate, 2,3-dimercapto-1-propanol, 1,2-dimercapto-1,3-butanediol, 2,3-dimercaptopropionic acid, 1,2-dimercaptopropyl-methyl-ether, 2,3-dimercaptopropyl-2',3'-dimethoxypropylether, 3,4-thiophene dithiol, 1,10-decane dithiol, 1,12-dodecane dithiol, 3,5,5-trimethylhexane-1,1-dithiol, 2,5-toluene dithiol, 3,4-toluene dithiol, 1,4-naphthalene dithiol, 1,5-naphthalene dithiol, 2,6-naphthalene dithiol, 1,9-nonane dithiol, norbornene-2,3-dithiol, bis(2-mercaptoisopropyl) ether, bis(11-mercaptoundecyl)sulphur, bis(2-mercaptoethyl)ether, bis(2-mercaptoethyl)sulphur, bis(18-mercaptooctadecyl)sulphur, bis(8-mercaptooctyl)sulphur, bis(12-mercapto-decyl)sulphur, bis(9-mercaptononyl)sulphur, bis(4-mercaptobutyl)sulphur, bis(3-mercaptopropyl)ether, bis(3-mercaptopropyl)sulphur, bis(6-mercaptohexyl)sulphur, bis(7-mercaptoheptyl)sulphur, bis(5-mercaptopentyl)sulphur, 2,2'-bis(mercaptomethyl)acetic acid, 1,1-bis(mercaptomethyl)cyclohexane, bis(mercaptomethyl)durene, phenylmethane-1,1-dithiol, 1,2-butane dithiol, 1,4-butane dithiol, 2,3-butane dithiol, 2,2-butane dithiol, 1,2-propane dithiol, 1,3-propane dithiol, 2,2-propane dithiol, 1,2-hexane dithiol, 1,6-hexane dithiol, 2,5-hexane dithiol, 1,7-heptane dithiol, 2,6-heptane dithiol, 1,5-pentane dithiol, 2,4-pentane dithiol, 3,3-pentane dithiol, 7,8-heptadecane dithiol, 1,2-benzene dithiol, 1,3-benzene dithiol, 1,4-benzene dithiol, 2-methylcyclohexane-1,1-dithiol, 2-methylbutane-2,3-dithiol, ethylene glycol dithioglycolate, ethylene glycol bis(3 mercaptopropionate). To be particularly mentioned amongst the trithiols are 1,2,3-propane trithiol, 1,2,4-butane trithiol, trimethylolpropane trithiol glycolate, trimethylopropane tris(3-mercaptopropionate), pentaerythritol trithioglycolate, pentaerythritol tris(3-mercaptopropionate), 1,3,5-benzene trithiol, and 2,4,6-mesitylene trithiol.

To be also mentioned as being useful polythiols in the present invention are neopentane tetrathiol, 2,2'-bis(mercaptomethyl)-1,3-propane dithiol, pentaerythritol tetrakis(3-mercaptopropionate), 1,3,5-benzene trithiol, 2,4,6-toluene trithiol, 2,4,6-methylenetrithiol, and polythiols corresponding to following formulas:

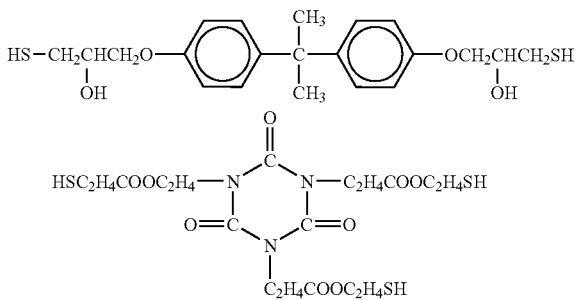

$(HSCH_2CH_2COOCH_2)_3CC_2H_5$ (TTMP), et and 4-mercaptomethyl-3,6-dithia-1,8-octane dithiol.

A preferred polythiol is the compound having following formula:

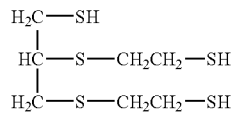

The polyisocyanate compounds to be used in the invention may be all the polyisocyanates which are traditionally employed for formulating polyurethanes.

To be especially mentioned are aliphatic compounds such as ethylene diisocyanate, trimethylene diisocyanate, tetramethylene diisocyanate, hexamethylene diisocyanate, octamethylene diisocyanate, nonamethylene diisocyanate, 2,2'-dimethylpentane diisocyanate, 2,2,4-trimethylhexane diisocyanate, decamethylene diisocyanate, butene diisocyanate, 1,3-butadiene-1,4-diisocyanate, 2,4,4-trimethylhexamethylene diisocyanate, 1,6,11-undecane triisocyanate, 1,3,6-hexamethylene triisocyanate, 1,8-diisocyanato-4-isocyanatomethyloctane, 2,5,7-trimethyl-1,8-diisocyanato-5-isocyanatomethyloctane, bis(isocyanatoethyl)carbonate, bis(isocyanatoethyl)ether, 1,4-butyleneglycol dipropylether-ω,ω'-diisocyanate, lysine diisocyanatomethyl ester, lysine triisocyanate, 2-isocyanatoethyl-,2,6-diisocyanato hexanoate, 2-isocyanatopropyl-2,6-diisocyanato hexanoate, xylylene diisocyanate, bis(isocyanatoethyl)benzene, bis(isocyanatopropyl)benzene, a,a,a',a'-tetramethylxylylene diisocyanate, bis(isocyanatobutyl)benzene, bis(isocyanatomethyl)naphthalene, bis(isocyanatomethyl)-diphenyl ether, bis(isocyanatoethyl)phthalate, mesitylylene triisocyanate and 2,6-di(isocyanatomethyl)furan; alicyclic polyisocyanates such as isophorone diisocyanate, bis(isocyanatomethyl)cyclohexane, dicyclohexylmethane diisocyanate, cyclohexane diisocyanate, methylcyclohexane diisocyanate, dicyclohexyl-dimethylmethane diisocyanate, 2,2'-dimethyldicyclohexylmethane diisocyanate, bis(4-isocyanato-n-butylidène)-pentaerythritol, dimer acid diisocyanate, 2-isocyanatomethyl-3-(3-isocyanatopropyl)-5-isocyanato-methyl-bicyclo-(2,2,1)-heptane, 2-isocyanatomethyl-2-(3-isocyanatopropyl)-6-isocyanatomethyl-bicyclo-(2,2,1)-heptane, 2-isocyanatomethyl-2-(3-isocyanatopropyl)-5-isocyanatomethyl-bicyclo-(2,2,1)-heptane, 2-isocyanatomethyl-3-(3-isocyanatopropyl)-6-isocyanatomethyl-bicyclo-(2,2,1)-heptane, 2-isocyanatomethyl-3-(3-isocyanatopropyl)-5-(2-isocyanatomethyl)-bicyclo-(2,2,1)-heptane, 2-isocyanatomethyl-3-(3-isocyanatopropyl)-6-(2-isocyanatoethyl)-bicyclo-(2,2,1)-heptane, 2-isocyanatomethyl-2-(3-isocyanatopropyl)-5-(2-isocyanatoethyl)-bicyclo-(2,2,1)-heptane and 2-isocyanatomethyl-2-(3-isocyanatopropyl)-6-(2-isocyanatoethyl)-bicyclo-(2,2,1)-heptane and aromatic compounds such as phenylene diisocyanate, tolylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, naphthalene diisocyanate, methylnaphthalene diisocyanate, biphenyl diisocyanate, tolidine diisocyanate, 4,4'-diphenylmethane diisocyanate, 3,3'-dimethoxybiphenyl-4,4'-diisocyanate, triphenylmethane triisocyanate, polymeric MDI, naphthalene triisocyanate, diphenylmethane-2,4,4'-triisocyanate, 3-methyldiphenylmethane-4,6,4'-triisocyanate, 4-methyldiphenylmethane-3,5,2',4',6'-pentaisocyanate, phenylisocyanatomethyl isocyanate, phenylisocyanatoethyl isocyanate, tetrahydronaphthylene diisocyanate, hexahydrobenene diisocyanate, hexahydrodiphenylmethane-4,4'-diisocyanate, diphenyl ether diisocyanate, ethylene glycol diphenyl ether diisocyanate, 1,3-propylene glycol diphenyl ether diisocyanate, benzophenone diisocyanate, diethylene glycol diphenyl ether diisocyanate, dibenzofuran diisocyanate, carbazole diisocyanate, ethylcarbazole diisocyanate and dichlorocarbazole diisocyanate; aliphatic polyisocyanate-containing sulphur such as thiodiethyl diisocyanate, thiodipropyl diisocyanate, thiodihexyl diisocyanate, dimethyl sulfone diisocyanate, dithiodimethyl diisocyanate, dithiodiethyl diisocyanate, and dithiodipropyl diisocyanate; sulphur-containing aromatic polyisocyanates such as diphenylsulphur-2,7'-diisocyanate, diphenylsulphur-4,4'-diisocyanate, 3,3'-dimethoxy-4,4,-diisocyanatodibenzylthioether, bis(4-isocyanatomethylphenyl)sulphur, and 4,4-methoxyphenylthioethyleneglycol-3,3'-diisocyanate, diphenyldisulphur-4,4'-diisocyanate, 2,2'-dimethyldiphenyldisulphur-5,5'-diisocyanate, 3,3'-dimethyldiphenylsulphur-6,6'-diisocyanate, 4,4'-dimethylphenyldisulphur-5,5'-diisocyanate, 3,3'-dimethoxydiphenyldisulphur-4,4' diisocyanate, and 4,4'-dimethoxy-diphenyldisulphur-3,3'-diisocyanate; diphenylsulfone-4,4'-diisocyanate, diphenylsulfone-3,3'-diisocyanate, benzidinesulfone-4,4'-diisocyanate, diphenylmethanesulfone-4,4'-diisocyanate, 4-methyldiphenylsulfone-2,4'-diisocyanate, 4,4'-dimethoxydiphenylsulfone-3,3' diisocyanate, 3,3'-dimethoxy-4,4'-diisocyanatodibenzyl sulfone, 4,4'-dimethyldiphenylsulfone-3,3' diisocyanate, 4,4'-ditert-butyldiphenylsulfone-3,3'-diisocyanate, 4,4'-methoxyphenylethylenedisulfone-3,3'-diisocyanate; 4-methyl-3-isocyanato-phenylsulfonyl-4'-isocyanatophenol ester and 4-methoxy-3-isocyanatophenylsulfonyl-4'-isocyanatophenyl ester; sulfonamide group-containing aromatic polyisocyanates such as 4-methyl-3-isocyanatophenylsulfonylanilide-3'-methyl-4'-isocyanate, diphenylsulfonyl-ethylenediamine-4,4'-diisocyanate, 4,4'-methoxyphenylsulfonylthylene-diamine-3,3'-diisocyanate, and 4-methyl-3-isocyanatophenylsulfonylanilide-4-methyl-3'-isocyanate, sulphur-containing heterocyclic compounds such as thiophene-2,5-diisocyanate; and 1,4-dithian-2,5-diisocyanate.

A preferred polyisocyanate is the compound of formula $C_6H_4(CH_2NCO)_2$.

Polymerizable compositions based on polythiols and polyisocyanates to be used in the invention are described in particular in the following U.S. Pat. No. 5,087,758, U.S. Pat. No. 5,191,055 and U.S. Pat. No. 4,775,733, U.S. Pat. No. 4,689,387, U.S. Pat. No. 5,837,797 and U.S. Pat. No. 5,608,115.

As previously explained, the sulphur polymer in the substrate may be selected from a polythiourethane-urea.

Polymerizable compositions for making substrates based on polythiourethane-urea are in particular described in the international patent application WO 03/042270.

As previously explained, the sulphur polymer in the substrate may also be selected from polyepisulfides.

Episulfide monomer-containing polymerizable compositions are described amongst others in EP 874 016 and EP 0 942 027.

Preferably, polymerizable monomers having at least one episulfide functionality are compounds with one or more episulfide structure(s) in the molecule, as illustrated by the following formula:

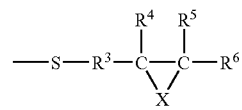

wherein $R^3$ represents a hydrocarbon group with from 1 to 10 carbon atoms, $R^4$, $R^5$ and $R^6$ each represent a hydrogen atom or a hydrocarbon group with from 1 to 10 carbon atoms, X represents S or O, provided that in the molecule the S average number represented by X be preferably approximately 50% or more of the S total number and O being the 3-membered ring.

A preferred class of polymerizable episulfide monomers include compounds of formula:

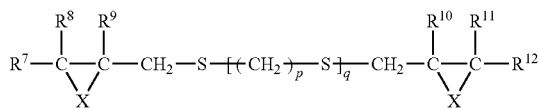

wherein $R^7$, $R^8$, $R^9$, $R^{10}$, $R^{11}$ and $R^{12}$ each represent a hydrogen atom or a hydrocarbon group with from 1 to 10 carbon atoms; X represents S or O, provided that in the molecule the S average number represented by X be preferably approximately 50% or more of the S total number and O being the 3-membered rings, p represents an integer of from 0 to 6 and q represents an integer of from 0 to 4.

Preferably, $R^3$ represents a methylene or an ethylene group and $R^4$, $R^5$ and $R^6$ and $R^7$, $R^8$, $R^9$, $R^{10}$, $R^{11}$ and $R^{12}$ each preferably represent a hydrogen atom, a methyl group. Even more preferably, $R^3$ represents a methylene group and $R^4$, $R^5$, $R^6$, $R^7$, $R^8$, $R^9$, $R^{10}$, $R^{11}$ and $R^{12}$ each represent a hydrogen atom.

The S average number is 50% or more, preferably 90% or more, more preferably 95% or more, most preferably 100% of the S total number and O being the 3-membered rings.

Examples of such compounds include linear organic compounds such as bis(β-epithiopropylthio)methane, 1,2-bis(β-epithiopropylthio)ethane, 1,3-bis(β-epithiopropylthio)propane, 1,2-bis(β-epithiopropylthio)propane, 1-(β-epithio propylthio)-2-(β-epithiopropylthiomethyl)propane, 1,4-bis (β-epithiopropyl thio)butane, 1,3-bis(β-epithiopropylthio) butane, 1-(β-epithiopropylthio)-3-(β-epithiopropylthiométhyl)butane, 1,5-bis(β-epithiopropylthio)pentane, 1-(β-epithiopropylthio)-4-(β-epithiopropylthiomethyl)pentane, 1,6-bis(β-epithio propylthio)hexane, 1-(β-epithiopropylthio)-5-(β-epithiopropylthiomethyl)hexane, 1-(β-epithiopropylthio)-2-[(2-β-epithiopropylthioethyl)thio]ethane and 1-(β-epithiopropylthio)-2-[[2-(2-β-epithiopropylthioethyl)thioethyl]thio]ethane; branched organic compounds such as tetrakis(β-epithio propylthiomethyl)methane, 1,1,1- tris(β-epithiopropylthiomethyl)propane, 1,5-bis(β-epithiopropylthio)-2-(β-epithiopropylthiomethyl)-3-thiapentane, 1,5-bis(β-epithiopropylthio)-2,4-bis(β-epithiopropylthiomethyl)-3-thiapentane, 1-(β-epithiopropylthio)-2,2-bis(β-epithiopropylthiomethyl)-4-thiahexane, 1,5,6-tris(β-epithiopropylthio)-4-(β-epithiopropylthiomethyl)-3-thiahexane, 1,8-bis(β-epithiopropylthio)-4-(β-epithiopropylthiomethyl)-3,6-dithiaoctane, 1,8-bis(β-epithiopropylthio)-4,5-bis(β-epithiopropylthiomethyl)-3,6-dithiaoctane, 1,8-bis(β-epithiopropylthio)-4,4-bis(β-epithiopropylthiomethyl)-3,6-dithiaoctane, 1,8-bis(β-epithiopropylthio)-2,4,5-tris(β-epithiopropylthiomethyl)-3,6-dithiaoctane, 1,8-bis(β-epithiopropylthio)-2,5-bis(β-epithiopropylthiomethyl)-3,6-dithiaoctane, 1,9-bis(β-epithiopropylthio)-5-(β-epithiopropylthiomethyl)-5-[(2-β-epithiopropylthioethyl)thiomethyl]-3-7-dithianonane, 1,10 bis(β-epithiopropylthio)-5,6-bis[2-β-epithiopropylthioethyl)thio]-3,6,9-trithiadecane, 1,11-bis(β-epithiopropylthio)-4,8-bis(β-epithiopropylthiomethyl)-3,6,9-trithiaundecane, 1,11-bis(β-epithiopropylthio)-5,7-bis(β-epithiopropylthio methyl)-3,6,9-trithiaundecane, 1,11-bis(β-epithiopropylthio)-5,7-[(2-β-epithiopropylthio)thiomethyl]-3,6,9-trithiaundecane and 1,11-bis(β-epithiopropylthio)-4,7-bis(β-epithiopropylthiomethyl)-3,6,9-trithiaundecane; and compounds obtained by substituting at least one hydrogen atom in the episulfide group by a methyl group, cycloaliphatic organic compounds such as 1,3- and 1,4-bis(β-epithiopropylthio)cyclohexanes, 1,3- and 1,4-bis(β-epithiopropyl-thiomethyl)cyclohexanes, bis[4-(β-epithiopropylthio)cyclohexyl]methane, 2,2-bis[4-(β-epithiopropylthio)cyclohexyl]propane, bis[4-(β-epithiopropylthio)cyclohexyl]sulphur, 2,5-bis(β-epithiopropylthiomethyl)-1,4-dithiane and 2,5-bis(β-epithiopropylthioethylthiomethyl)-1,4-dithiane; and compounds obtained by substituting at least one hydrogen atom in the episulfide group by a methyl group.

A preferred episulfide compound is bis(β-epithiopropyl) sulphur of formula:

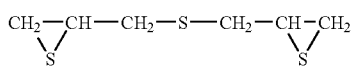

To facilitate the mold removal of such substrates, internal mold release agents may be incorporated thereto. Such agents are described in the European patent EP 271 839.

Preferred mold release agents are acid phosphates such as dibutyl phosphate. Zelec UN may be also mentioned, marketed by the Stepan company, which is a mixture composed of equal amounts of both following compounds:

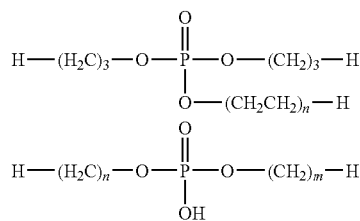

As a consequence of its presence, the internal mold release agent reduces the adhesion of the treatments, especially of the coatings, that are deposited thereafter onto the substrate.

The present invention is therefore very interesting for mold release agent-containing substrates.

Said substrate may be for example an ophthalmic lens, especially a glass for eyeglasses.

The invention may be used for substrates having a very low roughness Ra (mean deviation of the roughness profile as compared to the mean line), typically Ra<1 nm.

However, it is preferred to use substrates having a roughness ranging from 1 to 4 nm, or more preferably higher than 4 nm, preferably ranging from 5 to 30 nm.

Roughness may result from a molding which mold surfaces are not absolutely perfect. It also may be due to a chemical treatment, for example to an adapted alkaline treatment (potash, soda).

If some roughness is present, associated with the reducing treatment of the invention, outstanding results of adhesion performance may be obtained for the coatings deposited onto the substrate.

For determining Ra, measuring devices may be used, such as a MicroMap or a FTS type apparatus according to the protocol described in the patent application EP 1 218 439.

As previously explained, the substrate treated in accordance with the method of the invention is intended to be covered with a coating.

Preferably, the coating is an abrasion-resistant polymer coating.

Generally, the abrasion-resistant coating is obtained from a silane hydrolyzate composition, especially an epoxyalkoxysilane hydrolyzate, preferably an epoxydialkoxysilane or an epoxytrialkoxysilane hydrolyzate. Epoxyalkoxysilanes that could be suitably used are described in FR 2 702 486, WO 94/10230, U.S. Pat. No. 4,211,823 and U.S. Pat. No. 5,015,523.

A preferred abrasion-resistant coating composition comprises an epoxyalkoxysilane or an epoxydialkoxysilane or an epoxytrialkoxysilane hydrolyzate, a colloidal filler and aluminium acetylacetonate in a catalytic amount, the remainder being essentially composed of solvents classically used for formulating such compositions.

Preferably, the hydrolyzate used is a glycidoxypropyltrimethoxysilane hydrolyzate (GLYMO).

Generally, the hydrolyzate represents from 50 to 60% by weight of dry extract as related to the abrasion-resistant coating composition total weight.

The colloidal filler may be chosen for example from $SiO_2$, $ZrO_2$, $TiO_2$ and combinations thereof.

Generally, the thickness of the coating does vary from 1 to 10 μm, preferably from 2 to 6 μm, more preferably from 3 to 5 μm.

Anti-abrasion coatings are generally deposited by dip coating or spin coating (centrifugation).

It is a further object of the present invention to provide a method for coating at least one surface of a substrate based on sulphur polymer which comprises, prior to depositing the coating onto the surface of the substrate, a treating step of said surface using the treating method such as previously defined.

The invention will be further illustrated by means of the following examples.

EXAMPLES

Example 1

This example aims at comparing the adhesion of an abrasion-resistant coating on 3 substrates, that are similar in nature but that have undergone different surface preparations.

The substrates used are substrates based on a polythiourethane polymer resulting from the polymerization of the polyisocyanate monomer of formula $C_6H_4(CH_2NCO)_2$ with the polythiol monomer of following formula:

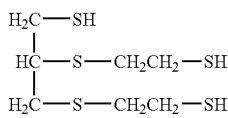

The properties of the substrates are as follows:
refractive index: 1.67
finished glass (the glass assumes its definitive form, its both main faces being surfaced or cast to the required geometry)
glass geometry: +0.00
results confirmed on glasses: −2.00 & −4.00

Each substrate, prior to depositing the coating, is submitted to a different surface treatment.

The first substrate is dipped for a few minutes into an acidic aqueous solution containing sodium lauryl ether sulfate as a surfactant, and maintained at a temperature of 50° C. Thereafter the substrate is rinsed off by being dipped into a deionized water bath, then successively treated in a 5% soda bath, and in a deionized water bath, and finally is cleaned in an alcohol bath.

The second substrate is dipped for a few minutes into a 20% soda solution, at a temperature of 50° C. Thereafter the substrate is rinsed off by being dipped into a deionized water bath, then successively treated in a 5% soda bath, and in a deionized water bath, and finally is cleaned in an alcohol bath.

The third substrate is dipped into a 5% sodium thioglycolate solution in a basic medium (pH value higher than 12), then into a deionized water bath, and finally is cleaned in an alcohol bath.

All the substrates are then covered with an abrasion-resistant coating composition.

The abrasion-resistant coating is obtained by polymerizing a composition comprising, as regards the dry matter content, 55% by weight of dry matter obtained by hydrolysis and condensation of GLYMO and 45% by weight of a mixed colloid $TiO_2$(anatase)/$ZrO_2$/$SiO_2$ dispersed at 20% by weight in the methanol.

The composition is applied onto the substrates by dip coating and the coated substrates are then pre-cured for 15 minutes at 60° C. and dried in an oven at 110° C. for 3 hours.

The substrates coated with the abrasion-resistant coating are then recovered and exposed to an irradiation by means of a Suntest apparatus, such as a XLS+ apparatus. Such apparatus provides a power of 280 W/cm² (60000 Lux in the middle of the plate). Hydrometry accounts for 40%. The air temperature is of 29° C. The sample temperature is of 23° C. The substrates are irradiated for 200 h.

The adhesion of the coatings toward the substrates has been measured during the irradiation.

The dry adhesion of the coating has been measured in accordance with standard ASTM D3359-93, by cutting out the coating using a razor to form a series of 5 lines spaced apart by 1 mm from each other, followed with a series of 5 lines spaced apart by 1 mm from each other, effected in the same way but arranged at right angle as compared to the first series of lines, the whole forming thus a grid of 25 squares. After blowing compressed air so as to remove all the dust resulting from cutting, a cellophane adhesive tape (3M SCOTCH® no 600) is applied and firmly pressed onto the lattice, before being rapidly pulled off in a direction that is perpendicular to the surface of the coating. This procedure is repeated twice with a new adhesive tape, similar to the one previously used.

The lens should then be inspected.
The adhesion score is noted as follows:

TABLE 1

| Adhesion score | Squares teared out | Surface % remaining intact |
|---|---|---|
| 0 | 0 | 100 |
| 1 | <1 | >96 |
| 2 | 1 to 4 | 96-84 |
| 3 | >4 to 9 | 83-64 |
| 4 | >9 to 16 | 63-36 |
| 5 | >16 | <36 |

Results are given in Table 2.

TABLE 2

|  | 0 h | 50 h | 100 h | 150 h | 200 h |
|---|---|---|---|---|---|
| Substrate 1 (acidic aqueous solution plus surfactant) | ++ | − | − | − | − |
| Substrate 2 (soda) | ++ | ++ | + | − | − |
| Substrate 3 (sodium thioglycolate) | ++ | ++ | ++ | ++ | + |

++: very good adhesion, no delamination could be observed (corresponds to the 0 score)
+: moderate adhesion, a few points of varnish could be observed (corresponds to the 1-2 score)
−: varnish adhesion loss (3 to 5 score).

A substantial improvement of the abrasion-resistant coating adhesion could be observed when the substrate had been treated with a composition of the invention.

Example 2

This example aims at comparing the adhesion of an abrasion-resistant coating to substrates having been submitted to different surface preparations.

The substrates used are substrates based on the same polythiourethane polymer as that described in Example 1.

Each substrate is submitted to a different surface treatment prior to depositing the coating.

The first substrate is dipped for a few minutes into an acidic aqueous solution containing sodium lauryl ether sulfate as a surfactant, and maintained at a temperature of 50° C. Thereafter the substrate is rinsed off by being dipped into a deionized water bath, then successively treated in a 5% soda bath, and in a deionized water bath, and finally is cleaned in an alcohol bath.

The second substrate is dipped for a few minutes into a 20% soda solution, at a temperature of 50° C. Thereafter the substrate is rinsed off by being dipped into a deionized water bath, then successively treated in a 5% soda bath, and in a deionized water bath, and finally is cleaned in an alcohol bath.

The third substrate is dipped into a treating composition of the invention, a 5% sodium thioglycolate composition in a basic medium (pH value higher than 12), then into a deionized water bath, and finally is cleaned in an alcohol bath.

Then, still prior to depositing the coating, each substrate is exposed to an irradiation by means of a Suntest apparatus, such as a XLS+ apparatus. Such apparatus provides a power of 280 W/cm² (60000 Luxes in the middle of the plate). Hydrometry accounts for 40%. The air temperature is of 29° C. The sample temperature is of 23° C. The substrates are irradiated for 100 h.

All the substrates are then covered with an abrasion-resistant coating composition. The abrasion-resistant coating composition is the same as that described in Example 1.

As for Example 1, the coating composition deposited onto the substrates by dip coating and the coated substrates are then pre-cured for 15 minutes at 60° C. and dried in an oven at 110° C. for 3 hours.

The substrates coated with the abrasion-resistant coating are then recovered and submitted to adhesion tests.

The adhesion of the coatings to the substrates has been measured using the previously described adhesion test.

The adhesion measurement is effected directly after the deposition and the curing of the abrasion-resistant coating at $t_0$.

Results are given in Table 3.

TABLE 3

| Surface treatment | Suntest exposure time to radiation | adhesion |
| --- | --- | --- |
| Substrate 1 (acidic aqueous solution plus surfactant) | 100 h | − |
| Substrate 2 (soda) | 100 h | − |
| Substrate 3 (sodium thioglycolate) | 100 h | ++ |

++: very good adhesion, no delamination could be observed
−: varnish adhesion loss It could be observed that the action of a treating composition of the invention enables the abrasion-resistant coating to adhere to the substrate at $t_0$.

Example 3

This example aims at measuring the resistance to the yellowing phenomenon for a substrate which has been submitted to a surface treatment according to the invention.

The tested substrates are substrates based on the same polythiourethane polymer as that described in Example 1.

Colorimetric measurements of the hue angle h* and of the Chroma C* are effected by means of a spectrophotometer and calculated according to the CIE system (L*, a*, b*).

The yellowness index Yi of the lenses is measured before the test and after the test, 200 hours later.

The yellowness index is determined spectroscopically in accordance with standard ASTM D-1325-63.

Yi=(128X−106 Z)/Y, wherein X, Y, Z are the trichromatic coordinates of the sample, taken by means of a UV-visible spectrophotometer active within the 380 to 780 nm spectrum.

The colorimetric measurements are carried out on a first bare substrate, that is to say without any surface treatment, at 0 h, then after 200 h irradiation using a Suntest apparatus such as described in Example 1.

The colorimetric measurements are also carried out on a second substrate having been submitted on both faces to a surface treatment using a sodium thioglycolate-containing composition in a basic medium (pH value higher than 12) of the invention, then having been irradiated for 200 h with a Suntest apparatus such as described in Example 1.

The results are given in Tables 4 and 5.

TABLE 4

| Surface treatment and exposure time to radiation | Yi | C* | h* |
| --- | --- | --- | --- |
| Bare substrate/0 h UV | 1.72 | 1.7 | 120.2 |
| Bare substrate/200 h UV | 3.42 | 2.7 | 113.3 |
| Thioglycolate treated substrate/200 h UV | 2.54 | 2.1 | 115.0 |

TABLE 5

| | Bare substrate/ 0 h | Bare substrate/ 200 h UV | ΔBare substrate/ 0 h − Bare substrate/ 200 h UV | Thioglycolate treated substrate/ 200 h UV | ΔBare substrate/0 h UV − thioglycolate treated substrate 200 h UV |
| --- | --- | --- | --- | --- | --- |
| L* | 94.82 | 94.54 | 0.28 | 94.68 | 0.14 |
| a* | −0.86 | 1.07 | 0.21 | −0.90 | 0.04 |
| b* | 1.48 | 2.49 | 1.01 | 1.94 | 0.46 |

In Table 4, the first substrate's (bare substrate) colorimetric coordinates L*, a* and b* were measured before irradiation (0 h) and after 200 h irradiation, the same procedure was applied to the second substrate, treated according to the invention (thioglycolate treated substrate) after 200 h irradiation. The variations of these colorimetric coordinates for the first bare substrate before and after irradiation were then observed, as well as for the first bare substrate before irradiation and the second treated substrate after irradiation.

The color variation is given by the following formula:

$$\Delta E = \sqrt{\Delta L^{*2} + \Delta a^{*2} + \Delta b^{*2}}$$

As a result thereof:
ΔE Bare substrate/0 hUV-Bare substrate/200 hUV>1
ΔE Bare substrate/0 hUV-Thioglycolate treated substrate/200 hUV<1

It can thus be observed that the color variation for a substrate which was submitted to a sodium thioglycolate-based surface treatment according to the invention is very limited as compared to a substrate which did not receive any previous surface treatment.

Example 4

Combinated Effect of a Reducing Agent-Based Treatment Plus Surface Roughness

Polythiourethane ophthalmic lenses obtained by polymerizing bis(isocyanomethyl)norbornane, pentaerythritol tetrakis(mercaptopropionate) (PETMP) and 4-mercaptomethyl-3,6-dithia-1,8-octane dithiol and having a surface roughness Ra of 10 nm were treated using a treating composition of the invention similar to that of the third substrate in Example 1. The same abrasion-resistant coating as that of Example 1 was then deposited.

100% of the glasses had an adhesion ++ after 250 hours Suntest (same apparatus and conditions as in Example 1).

The surface roughness Ra had been measured by means of a Micromap 512 apparatus.

The invention claimed is:
1. A method for coating at least one surface of a substrate comprising a sulphur polymer, comprising, prior to depositing the coating onto the surface of the substrate, a treating step of said surface using a treating composition comprising at least one reducing agent which is able to reduce C—S, S—S, CON bonds and salts in the sulphur polymer forming the substrate, causing the sulphur polymer to functionalize through the creation of SH bonds near the surface by contact with the reducing agent,
wherein the treating step comprises at least the steps of:
dipping the substrate into at least a bath comprising the treating composition, and
rinsing off the substrate by dipping it into a deionized water bath.

2. The method of claim 1, wherein the at least one reducing agent is a thioacid or salt thereof.

3. The method of claim 1, wherein the at least one reducing agent is thioglycolic acid, potassium thioglycolate, sodium thioglycolate, calcium thioglycolate, magnesium thioglycolate, glycerol monothioglycolate, ammonium thioglycolate, an amine thioglycolate, diammonium dithioglycolate, thiolactic acid, ammonium thiolactate, guanidine thioglycolate, thiomalic acid, 2-mercaptoproprionic acid, 3-mercaptoproprionic acid, lipoic acid, dihydrolipoic acid, thiosalicylic acid, dithioerythritol, thioglycerol, thioglycol, dithioerythritol, dithiothreitol, 1,3-dithiopropanol, thioxanthine, cysteine, homocysteine, N-acetyl-L-cysteine, cysteamine, N-acetyl-cysteamine, N-propionyl-cysteamine, pantheteine, $NaHSO_3$, LiS, $Na_2S$, $K_2S$, MgS, CaS, SrS, BaS, $(NH_4)_2S$, sodium dihydrolipoate 6,8-dithiooctanoate, sodium 6,8-dithiooctanoate, a hydrogen sulfide salt, thioglycolamide, glutathione, thioglycol hydrazide, keratinase, hydrazine sulfate, hydrazine disulfate, triisocyanate, 2,3-dimercaptosuccinic acid, N-(mercaptoalkyl)-ω-hydroxyalkyl amide, N-mono or N,N-dialkylmercapto-4-butyramide, aminomercapto-alkyl amide, N-(mercaptoalkyl)succinamic acid derivative and N-(mercaptoalkyl)succinimide derivative, alkylamino mercaptoalkyl amide, azeotropic mixture of 2-hydroxypropyl thioglycolate and (2-hydroxy-1-methyl)ethyl thioglycolate, mercaptoalkyl aminoamide, N-mercapto-alkylalkane diamide and formamidine sulfinic acid derivative, sulfite, or bisulfite, or salts thereof.

4. The method of claim 3, wherein the at least one reducing agent is sodium thioglycolate, potassium thioglycolate, ammonium thioglycolate or amine thioglycolate.

5. The method of claim 3, wherein the amine thioglycolate is monoethanol amine thioglycolate.

6. The method of claim 3, wherein the hydrogen sulfide salt is NaSH or KSH.

7. The method of claim 1, wherein the pH value of the treating composition is higher than 10.

8. The method of claim 7, wherein the pH value of the treating composition is higher than 12.

9. The method of claim 1, wherein the treating composition comprises from 2 to 30% by weight, based on the total weight of the composition, of the at least one reducing agent.

10. The method of claim 9, wherein the treating composition comprises from 2 to 15% by weight, based on the total weight of the composition, of the at least one reducing agent.

11. The method of claim 10, wherein the treating composition comprises from 5 to 10% by weight, based on the total weight of the composition, of the at least one reducing agent.

12. The method of claim 1, wherein the treating composition comprises at least one metal sulphur.

13. The method of claim 1, wherein the method does not comprise a subsequent step of applying a soda solution onto the substrate.

14. The method of claim 1, further comprising an additional treating step with an oxidizing composition comprising at least one oxidizing agent.

15. The method of claim 14, wherein the at least one oxidizing agent is hydrogen peroxide, alkali bromate, polythionate and/or a persalt.

16. The method of claim 15, wherein the persalt is further defined as a perborate, percarbonate, persulfate and/or permanganate.

17. The method of claim 14, wherein the at least one oxidizing agent is $H_2O_2$ or $KMnO_4$.

18. The method of claim 14, wherein the oxidizing composition comprises from 2 to 15% by weight, based on the total weight of the composition, of the at least one oxidizing agent.

19. The method of claim 18, wherein the oxidizing composition comprises from 5 to 10% by weight, based on the total weight of the composition, of the at least one oxidizing agent.

20. The method of claim 1, further comprising an additional treating step with a phosphorylation composition comprising at least one phosphorylating agent.

21. The method of claim 20, wherein the at least one phosphorylating agent is a trialkylphosphite, phosphonic acid and/or phosphinic acid.

22. The method of claim 20, wherein the phosphorylation composition comprises from 2 to 15% by weight, based on the total weight of the composition, of the at least one phosphorylating agent.

23. The method of claim 22, wherein the phosphorylation composition comprises from 5 to 10% by weight, based on the total weight of the composition, of the at least one phosphorylating agent.

24. The method of claim 1, wherein the sulphur polymer in the substrate is a polythio(meth)acrylate, polythiourethane, polythiourethane-urea and/or polyepisulfide.

25. The method of claim 24, wherein the sulphur polymer is a polythiourethane resulting from the polymerization of at least one polyisocyanate monomer and at least one polythiol monomer.

26. The method of claim 25, wherein the polyisocyanate monomer is the compound of formula $C_6H_4(CH_2NCO)_2$ and the polythiol monomer is the compound of formula $C(CH_2OC(O)CH_2CH_2SH)_4$.

27. The method of claim 25, wherein the polyisocyanate monomer is the compound of formula $C_6H_4(CH_2NCO)_2$ or the bis(isocyanomethyl) norbornane, and the polythiol monomer is the compound of formula:

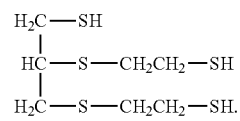

28. The method of claim 1, wherein the substrate has a roughness Ra lower than 4 nm.

29. The method of claim 1, wherein the substrate has a roughness Ra ranging from 1 to 4 nm.

30. The method of claim 1, wherein the substrate has a roughness Ra ranging from 5 to 30 to nm.

31. The method of claim 1, wherein the substrate is further defined as an ophthalmic lens.

32. The method of claim 31, wherein the ophthalmic lens is a glass for eyeglasses.

33. The method of claim 1, wherein the coating is an abrasion-resistant polymer coating.

34. The method of claim 33, wherein the polymer coating is a coating based on an epoxyalkoxysilane hydrolyzate.

35. The method of claim 34, wherein the polymer coating is an epoxydialkoxysilane or an epoxytrialkoxysilane hydrolyzate.

36. The method of claim 33, wherein the thickness of the coating is 1 to 10 μm.

37. The method of claim 36, wherein the thickness of the coating is 2 to 6 μm.

38. The method of claim 37, wherein the thickness of the coating is 3 to 5 μm.

* * * * *